Feb. 23, 1932.    F. W. DAVIS    1,846,089
SERVO MOTOR
Filed July 14, 1927    2 Sheets-Sheet 1

Inventor:
Francis W. Davis.
by Wright Brown Quinby & May
Attys.

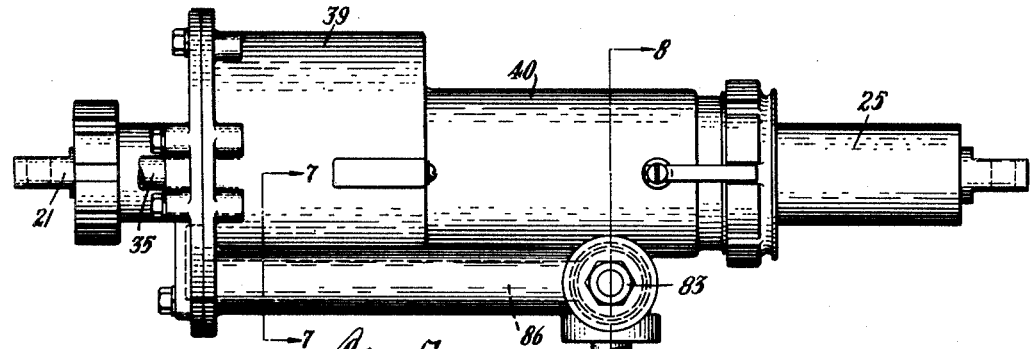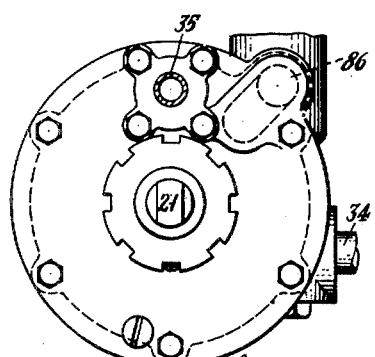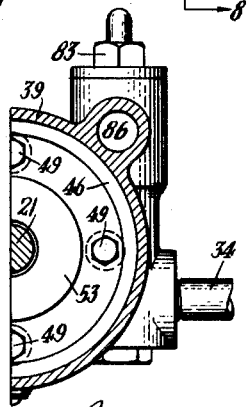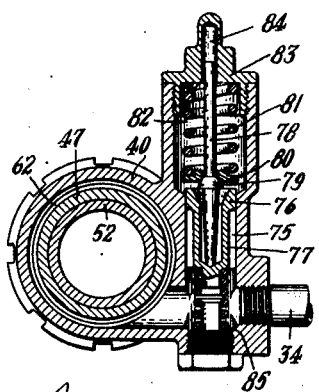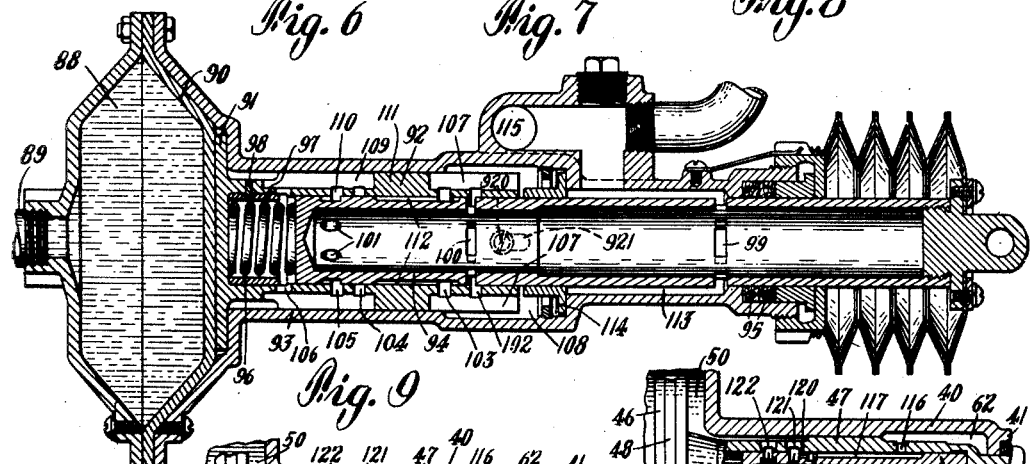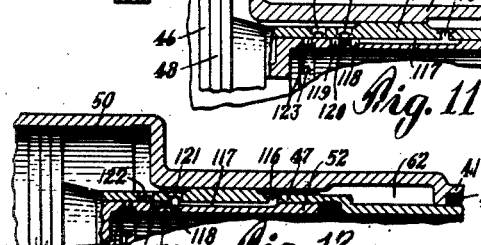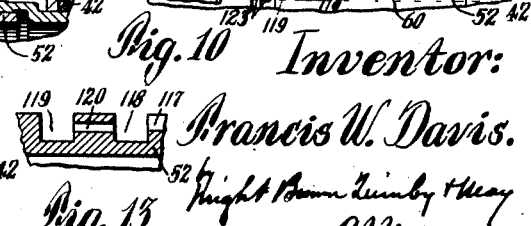

Patented Feb. 23, 1932

1,846,089

UNITED STATES PATENT OFFICE

FRANCIS W. DAVIS, OF WALTHAM, MASSACHUSETTS

SERVO-MOTOR

Application filed July 14, 1927. Serial No. 205,634.

This invention has relation to servo-motors by which a power driven member is controlled by and follows the motion of a member directly actuated by an operator. The invention involves means for applying and controlling the power in a novel way, and more particularly to vary the rapidity of the follow-up motion of the power-driven member over different portions of its stroke according to the functions performed by the member by each portion of its stroke. The embodiments of my invention which are herein shown and described are adapted to utilize a fluid under pressure (preferably a liquid such for example as a glycerine mixture, or an oil) for the actuation of the power-driven member. They are moreover especially designed for use in actuating brakes on automobiles, though it is obvious that mechanism involving the same principles of follow-up control may be employed wherever servo-motors are needed or desired, particularly for special types of service.

The operation of an ordinary automobile brake calls for a special type of servo-motor control for best results. Most brakes are provided with plenty of clearance from the friction surface when in their "off" position so as to avoid the possibility of any drag which would oppose the motion of the vehicle. When the brake is applied, as by a pedal, most of the motion of the pedal is occupied in taking up this slack or clearance, and is against little or no opposition. When the slack has been taken up and the brake brought against the friction surface, there then follows a relatively short portion of the stroke of the pedal against rapidly increasing resistance as the braking surfaces are pressed together. Where the brake is operated by a piston working in a cylinder under fluid pressure, a relatively large piston is required for moderate fluid pressures to give the required braking force. If the power fluid is used to move the piston through its entire stroke, a great deal of fluid will be used to move the piston against little or no opposition. If the power fluid is being supplied slowly, this may entail delay or lag in the operation of the brake when the pedal is depressed quickly as in an emergency. To overcome this objection, means are provided for effecting a rapid follow-up motion with the use of comparatively little power fluid, the fluid pressure being brought to bear on the whole piston surface only after the slack in the brake has been taken up. By a modified embodiment of the invention, means are provided for taking up the slack by pressure against the piston when the controlling pedal is moved slowly, calling into play a quick follow-up mechanism if the pedal is moved quickly to take up slack, and using the fluid pressure against the whole piston for the actual braking force.

My improved servo-motor is of a type permitting the free flow of power fluid through the mechanism at negligible pressures when the motor is not in use. In using the motor, the flow of fluid is partially or wholly obstructed, thus building up pressure which operates the brake. There is thus relatively little power absorbed by the mechanism except when in actual use. This type of power-actuated brake is also particularly suited for use with a power steering gear for automobiles such as described in my application Serial No. 190,526, filed May 11, 1927, maturing into Patent No. 1,790,620, for hydraulic steering mechanism. This steering mechanism is of a type having a power cylinder through which there is a normally continuous flow of power fluid. The fluid leaving the steering mechanism can be conducted through the servo-motor for the brakes before returning to the pump for recirculation.

Various other advantageous features of the invention will be apparent to one skilled in the art from the disclosure thereof in the following description and on the drawings, of which,—

Figure 5 is a plan view of the servo-motor shown in Figures 2 and 3.

Figure 6 is a forward end view of the same.

Figure 7 is a section on the line 7—7 of Figure 5.

Figure 8 is a section on the line 8—8 of Figure 5.

Figure 9 is a modified form of motor adapted for use with fluid-actuated brakes.

Figures 10, 11 and 12 show in section a modified form of valve mechanism for the servo-motor in three different positions of operation.

Figure 13 shows on a larger scale a portion of the mechanism shown in Figures 10-12.

Figure 1:
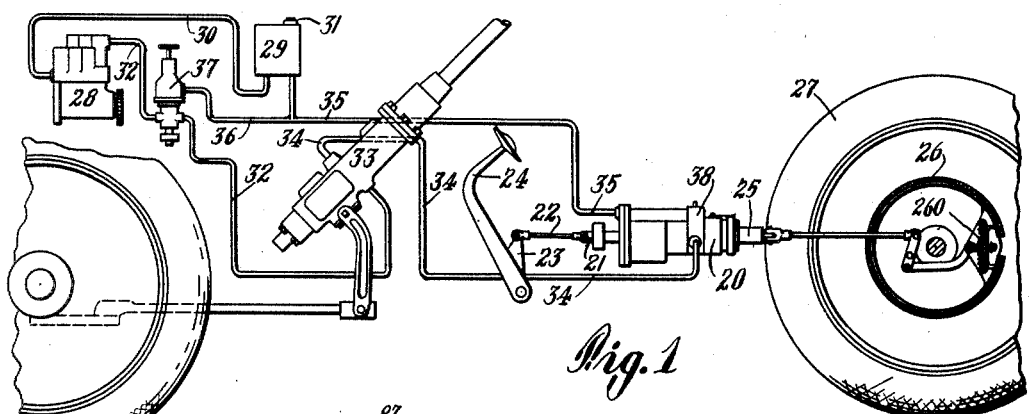
Figure 1 represents diagrammatically an installation of a servo-motor embodying the invention, in combination with a power fluid supply system and a power-actuated steering gear for an automobile.

Referring to the drawings in detail, a servo-motor for use with automobile brakes is indicated at 20. Projecting from the forward end of the casing which contains the motor is a rod 21 which may be attached by a suitable link 22 to a rock arm 23 which is operable by a pedal 24. From the rear end of the casing of the motor, another rod 25 projects, the end of this rod being connected by suitable linkage to a brake member 26 arranged to engage a drum on one of the vehicle wheels 27. Suitable springs as at 260 may be provided to hold the brakes in their "off" position except when braking pressure is applied by the operator. Any suitable source of fluid power may be utilized. As shown, a pump 28 is provided which may be connected if desired to the cam shaft of the motor which drives the vehicle, or may be operated in any other desired way. A suitable tank or reservoir 29 is provided with a connecting pipe 30 extending therefrom to the intake end of the pump 28. The tank 29 is preferably provided with a filling opening which is covered by a clousure 31 having an air vent therein so that the surface pressure on the liquid in the tank is atmospheric. The pump 28 discharges into a pipe 32 which may lead directly to the servo-motor 20 for actuating the brakes of the vehicle, or as shown in Figure 1 may first lead to a hydraulic steering mechanism 33 through which, as described in my application Serial No. 190,526, filed May 11, 1927, the power fluid normally flows continuously. The fluid leaves the steering mechanism 33 by a pipe 34 by which it is brought to the intake opening of the servo-motor 20. After passing through the servo-motor, it is returned to the tank 29 as by a pipe 35. A by-pass 36 is preferably provided connecting the pipe 32 with the pipe 35, the by-pass being controlled by a suitable spring-pressed valve 37 which may be regulated to open when the pressure in the pipe 32 exceeds a predetermined amount, thus discharging the fluid from the pump directly back to the tank 29 whenever an obstruction in the steering gear 33 raises the pressure beyond the point for which the valve 37 is set. As will be hereinafter set forth, the servo-motor 20 is of such a type that a continuous flow of power fluid is permitted therethrough normally. This is also true of the steering power mechanism 33, so that when neither the mechanism 33 nor the motor 20 is in actual use, the circulation of liquid through the system is practically unobstructed except for fluid friction in the piping, and very little load is put upon the pump 28. Actuation of either of the power mechanisms results in a building up of sufficient pressure in the supply line 32 to actuate the motor as required. The motor 20 is supplied with a separate spring-pressed by-pass valve 38 which may be set to open at a considerably lower pressure than the relief valve 37. For example, the valve 37 may be set to open when the pressure in the pipe 32 reaches three hundred pounds to the square inch, while the valve 38 may be set for one hundred pounds. This difference of setting leaves an ample available pressure of two hundred pounds for the operation of the steering mechanism 33 even when the motor 20 is operating at its maximum pressure and thus exerting one hundred pounds back pressure on the steering mechanism. These figures are, however, merely illustrative and may be varied to suit particular mechanisms or operating conditions.

Figure 2:
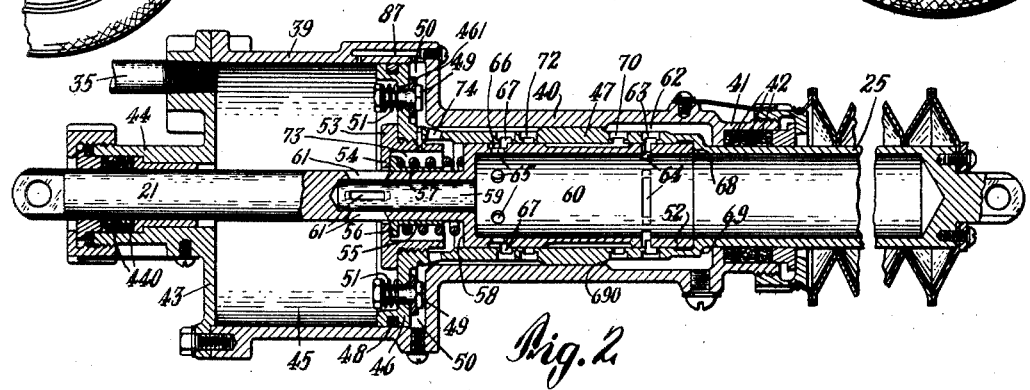
Figure 2 is a longitudinal section of a servo-motor embodying the invention.
Figure 3:
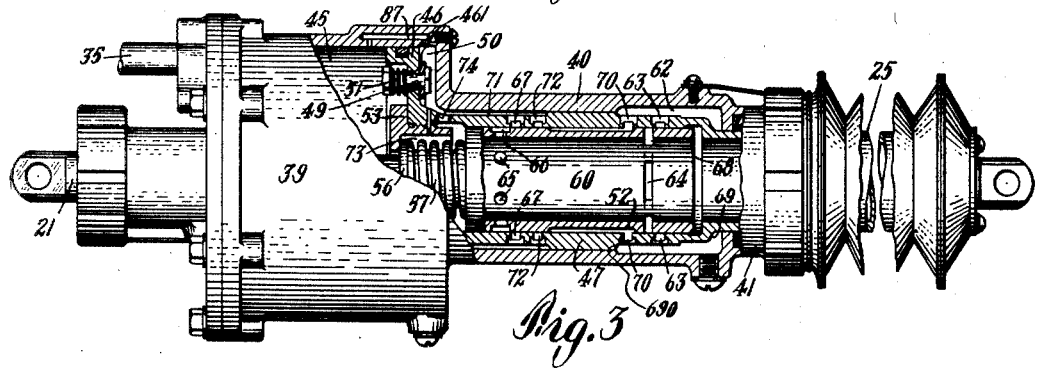
Figure 3 is a side elevation of the same with a portion broken away to show the working parts in a second position of operation.
Figure 4:
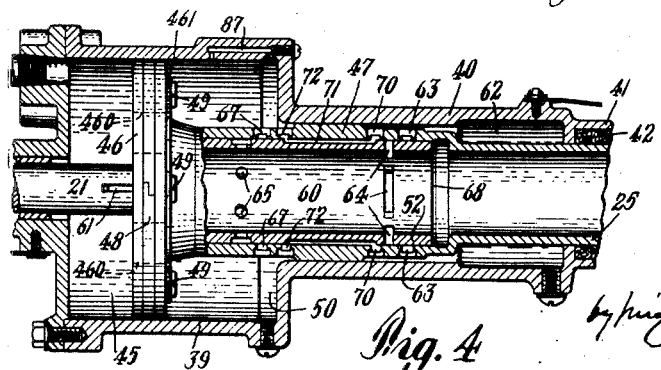
Figure 4 is a fragmentary longitudinal section of the motor shown in Figures 2 and 3, this figure showing the parts in a third position of operation.

The construction of the servo-motor 20 is illustrated in Figures 2, 3 and 4. In describing the mechanism, the motor 20 will be thought of as installed as shown in Figure 1, with the rod 21 projecting forwardly therefrom. It is obvious, however, that the motor may be installed in a reverse or any other direction relative to the vehicle. The motor is contained in a casing which comprises a relatively large cylindrical portion 39 having a reduced extension 40 extending rearwardly therefrom, this extension having a smaller extension 41 which is adapted to receive suitable packing rings 42 to prevent leakage of the power fluid which for convenience will be hereinafter termed "oil" from the cylinder. It is to be understood that any fluid desired may be used with this motor, liquids, however, being considered preferable on account of their practical incompressibility which prevents undesirable elastic operation of the mechanism. The cylinder 39 is provided with a cover member 43 on the forward end thereof having an extension 44 adapted to receive suitable packing rings 440 to surround the rod 21 and prevent leakage of oil from the chamber 45 in the cylinder 39. Within the casing 39 and 40 is a piston 46 comprising a disk slidably fitted within the cylinder 39 and a rearwardly extending cylindrical portion or stem 47 slidably fitted in the cylindrical extension 40. The piston 46 may be provided with one or more piston rings 48 to give it a fluid-tight fit within the cylinder 39. A number of ports 460 are preferably formed passing through the piston 46 and closed by a one-way valve member which permits liquid to flow from the chamber 45 rearwardly through the piston to the chamber 50 formed by the cylinder 39 and the rear face of the piston 46. The valve member may be in the form of a flat ring 461 normally resting against the face of the piston 46 and covering the ports 460 which are preferably arranged for this purpose in a circular series. A plurality of bolts 49 may be carried by the ring 461 to hold it lightly against the piston. The bolts 49 pass loosely through the piston and are provided with light springs 51 as shown which hold the ring in place. The ports 460 are preferably relatively large or numerous so that when the pressure in the chamber 45 exceeds that in the chamber 50, a rapid flow of liquid from the former to the latter is permitted, but passage of liquid in the reverse direction is prevented by the seating of the ring 460 against the face of the piston 46. Any other suitable one-way valve construction may be substituted for the ring and bolts shown. The stem 47, which is an integral part of the piston 46, has a further rearwardly extending reduced portion which comprises the rod 25 and to which the brake is directly connected. The stem 47 is hollow. Slidably fitted therein is a hollow cylindrical valve slide 52 which is integral with or secured to the rod 21, the latter passing through a central aperture in the disk portion of the piston 46. This central aperture is larger than the rod 21 and receives in threaded engagement a suitable hollow nut 53 which has a flange 54 supporting a bushing 55 which is slidably fitted about the rod 21. The bushing 55 has a flange 56 against which rests an end of a compression spring 57, the other end of which rests against a shoulder 58 between the rod 21 and the valve slide 52 which is preferably formed integrally therewith and is of larger diameter. The portion of the rod 21 adjacent to the valve slide 52 is centrally hollowed as at 59, forming a longitudinal passage extending from the chamber 60 within the valve slide 52 to a point forward of the piston 46, at which point it communicates with the chamber 45 as by a series of radial slots 61. The normal progress of power fluid through the motor is as follows:—

Power fluid is introduced into a chamber 62 within the rearward end of the extension 40. From this chamber it passes through a series of ports 63 through the wall of the extension 47 of the piston which normally registers with a series of ports 64 through the wall of the valve slide 52. The oil thus enters the chamber 60, flows through the passage 59 and the ports 61 into the chamber 45 and is discharged through the pipe 35 which leads from the chamber 45 to the tank 29. At the same time, the oil is given free access to the chamber 50, which is on the rearward side of the piston disk, through a series of ports 65 extending through the wall of the valve slide 52 and connecting with a peripheral groove 66 which as shown in Figure 2 normally registers with a groove 67 in the inner wall of the piston extension 47, the groove 67 communicating by suitable ports with the chamber 50. Thus the oil is permitted normally to flow through the motor without obstruction, so that its pressure is little, if any, above atmospheric.

The valve slide 52 is permitted a limited sliding movement within the extension 47, this movement being rearwardly limited by an internal shoulder 68 between the stem 47 and the rod 25 which is as shown integral therewith but of smaller diameter. The forward motion of the slide 52 relative to the piston is limited by the rear end of the nut 53 against which the shoulder 58 on the slide 52 may engage. If a supply of power fluid is not available, the brake will operate mechanically in the usual way, after an amount of lost motion represented by the distance between the shoulder 58 and the nut 53 is taken up. When, however, oil is supplied to the motor, forward movement of the rod 21 tends to move the ports 63, 64 out of registry with one another, as shown in Figure 3, so that the admission of oil into the chamber 60 and hence into the chamber 45 is restricted. This raises the pressure in the chamber 62, the pressure acting on a shoulder 69 between the stem 47 and the rod 25 and a shoulder 690 adjacent to the ports 70 to press the entire piston and the rod forwardly to follow up the forward motion of the control rod 21. During the taking up of the slack in the brake, this follow-up motion will therefore be quite rapid as a relatively small amount of fluid will be needed to fill the volume of the chamber 62 which increases as the piston moves forwardly. The chamber 50 will be enlarged by such motion and will receive oil from the shrinking chamber 45. Part or all of this transfer of oil may take place through the ports 61, 65, 66, 67 if the rod 21 and slide 52 in their forward motion do not keep sufficiently in the lead of the stem 47 to close the ports 66, 67. If these ports are closed during the forward travel of the rod 21, the oil will pass through the ports 460. When the slack in the brake has thus been taken up and a greater resistance is offered by the brake through the rod 25, increased pressure on the pedal 24 will pull the rod 21 and the valve slide 52 further forward with relation to the piston against the expanding force of the spring 57 until the parts assume the positions illustrated in Figure 4. At this stage, the ports 64 are closed by the wall of the stem 47 and the chamber 62 is connected with the chamber 50 by a series of ports 70 which communicate with the longitudinal channels 71 formed in the outer surface of the valve slide 52. The channels 71 now communicate at their forward end with a series of ports 72 passing through the wall of the stem 47 and communicating with the chamber 50. At the same time, the ports 65 have been moved forwardly out of registry with the ports 67 so that escape of oil from the chamber 50 into the chamber 60 is thus cut off. Hence the oil which is introduced into the chamber 62 is all conducted to the chamber 50 and presses against the rearward face of the piston 46, pressing the piston forward and with it the rod 25 which is connected to the brake. The tension on the rod 21 from the actuation of the pedal 24 is opposed not only by the spring 57, but also by back pressure of the oil on the shoulder 58. It will be noticed from Figure 2 that the nut 53 and the shoulder 58 form with a portion of the stem 47 an inner chamber 73 which contains the spring 57 and which communicates with the chamber 50 as by a suitable port 74. Thus whenever there is oil pressure in the chamber 50, this pressure is communicated to the chamber 73 and acts rearwardly on the shoulder 58. Since the rearward thrust of the oil on the shoulder 58 and hence on the rod 21 is proportional to the pressure of the oil itself, the mechanism thus has a certain amount of "feel", that is, the required pressure which must be exerted by the operator on the pedal 24 is variably resisted by and amount proportion to, although considerably less than, the force applied to the brake. When the pedal is released by the operator, the spring 57, assisted by oil pressure against the shoulder 58, moves the valve slide 52 rearwardly with respect to the piston to the position shown in Figure 2, thus bringing the ports 65, 67 into registry and permitting the escape of oil from the chamber 50 into the chamber 60 and thence to the chamber 45 and out through the pipe 35. The movable portions of the mechanism are thereupon drawn rearwardly by the action of the spring or springs 260.

The means for supplying oil to the chamber 62 and the spring-controlled by-pass valve are illustrated in Figures 6, 7 and 8. Oil enters the casing through the supply pipe 34 which communicates with the chamber 62 as shown in Figure 8. A branch passage 75 extends upwardly, this passage containing a sliding valve member 76 which is snugly fitted therein and which is formed with a series of longitudinal grooves 77 extending from the lower portion thereof to a point adjacent to the upper end thereof. This valve slide is preferably hollow and receives therein the lower portion of a valve stem 78 which is shouldered at 79 to carry a washer 80 against which a suitable spring 81 presses the valve downwardly. The passage 75 enlarges into a chamber 82 which contains the spring 81 and the valve stem 78 and is suitably closed at its upper end as by a screw cap 83. This cap has a recess 84 therein to receive and guide the upper end portion of the valve stem 78. The engagement of the lower end of the valve stem 78 with the valve slide at a point near the lower portion of the slide prevents any possibility of a binding action of the slide being caused by the opposing forces of the oil from below and the spring 81 from above. To prevent vibration or chattering of the valve stem 76, a suitable cushion spring 85 may be provided between the lower end of the valve slide and the wall of the casing. The chamber 82 communicates with a passage 86 extending forwardly and entering the chamber 45 so that when the oil pressure in the pipe 34 is sufficient to force the valve slide 76 against the spring 81 to a point where the channels 77 open into the chamber 82, the oil thereupon escapes through the passage 86 into the chamber 45 and out through the pipe 35.

In order to prevent the accumulation of air bubbles in the chamber 50 which would otherwise tend to make the action of the motor undesirably elastic on account of the compressibility of air or other gas, a small relief passage 87 is formed in the wall of the cylinder 39, this passage extending longitudinally for a distance slightly greater than the thickness of the piston disk 46 and opening into the interior of the cylinder 39 at two spaced points as shown in Figure 2. When the piston is in the position illustrated in Figure 2 and the oil pressure in the chamber 50 is raised to exceed that in the chamber 45, any air bubbles which may have accumulated in the top of the chamber 50 will be expelled through the passage 87 into the chamber 45 and will be swept out through the pipe 35 by the flow of oil. It is obvious that this passage will operate only when the piston is between the two ports connecting it with the interior of the cylinder.

Figure 9 illustrates a modified embodiment of my invention adapted for use with brakes which are directly actuated by fluid pressure. As shown, a closed chamber 88 is provided to contain the fluid by which the brake is directly operated, this fluid being conducted to the brake as by a suitable connecting pipe 89. A fluid-tight flexible diaphragm 90 extends across the chamber 88 and pressure on this diaphragm from the right forces fluid from the chamber 88 into the pipe 89 to set the brakes. The diaphragm 90 may be moved forward by direct mechanical pressure thereon through a plate 91 carried at the end of a hollow cylindrical stem 92 which slides in a cylindrical extension 93 of the casing enclosing the chamber 88. Within the stem 92 is slidably fitted the forward end of a hollow rod 94 which projects rearwardly from the casing and is attachable to an operating pedal. Means are provided for keeping the rod 94 in place in the stem 92, such means permitting sufficient relative motion between the rod and stem for the operation of the mechanism. For this purpose, a screw or pin 920 may be carried by the stem 92 projecting inwardly into a groove or slot 921 formed in the outer surface of the rod 94. The motion of the rod relative to the stem is thus limited by the engagement of the screw or pin 920 with either end of the groove 921. Suitable packing 95 is provided to prevent leakage of oil from the casing at the point where the rod projects therefrom. The rod is closed at both ends, the forward end of the rod bearing against a suitable spring 96 which in turn bears against the rear face of the plate 91. Surrounding the spring and fitted within the forward end portion of the stem 92 is a stop collar 97 which abuts the rear face of the plate 91 and may be held in place as by a suitable pin 98. As the rod 94 slides forwardly in the stem 92, its forward motion is limited by the rear end of the stop collar 97 so that when the forward end of the rod 94 engages the stop collar, further forward motion of the rod carries the plate 91 therewith and forces fluid from the chamber 88 into the pipe 89 to actuate the brake. Thus forward pressure on the rod 94 by a pedal 24 can actuate the diaphragm 90 mechanically after the lost motion between the rod 94 and the stem 92 has been taken up against the pressure of the spring 96. In order to bring fluid power into play to assist in the displacement of the diaphragm 90, the hollow rod 94 is provided with three sets of ports 99, 100, 101 extending through the wall thereof. The stem 92 is provided with five sets of ports 102, 103, 104, 105, 106. In the outer wall of the stem 92 a series of longitudinal grooves or recesses 107 are formed, all communicating with a chamber 108 enclosed in the adjacent portion of the casing 93. A series of longitudinal recesses or grooves 109 is formed in the outer wall of the forward portion of the stem 92, these being connected by a peripheral passage 110 to form therewith a forward chamber within the casing 93, the chambers 108 and 110 being normally separated from each other by an intermediate portion 111 of the stem 92. In the outer wall of the rod 94 is formed a number of longitudinal channels 112 which are of sufficient length to connect the ports 103 and 104 when the rod 94 is moved forwardly with respect to the stem 92. The action of the oil in this mechanism is as follows:—

The oil is introduced into the chamber 108 and normally flows through the registering ports 102 and 100 into the interior of the rod 94, and from thence out through the ports 99 into a chamber 113 which communicates with the discharge pipe 35. The chamber 113 may be separated from the chamber 108 by a fluid-tight collar 114 slidably fitted around the rod 94 and held in place by suitable spring washers. When the rod 94 is moved forwardly by foot pressure on the pedal 24, the passage of oil into the interior of the rod through the ports 102, 100, is restricted or cut off as these ports move out of registry. At the same time, the longitudinal grooves 112 move forwardly so as to connect the ports 103 with the ports 104, thus permitting oil to flow from the chamber 107 into the chamber 110. The motion of the rod 94 which brings the channels 112 into communication with the ports 103, 104, moves the ports 101 out of registry with the ports 105 so that escape of oil from the chamber 10 is cut off and the oil pressure is exerted against the plate 91 and the diaphragm 90. The pressure of the spring 96 tends to move the rod 94 back to the position shown in Figure 9. This tendency of the spring is augmented by fluid pressure against the forward end of the rod 94, the oil having access to the end of the rod through the ports 106. Thus the back pressure of the oil on the foot of the operator is thus proportional to the pressure of the oil on the diaphragm so that the mechanism affords a certain amount of "feel" to the operator. When the pressure on the pedal is released, the spring 96 moves the rod 94 rearwardly with respect to the stem 92 opening discharge pipes for the oil in the chamber 110 through the ports 101 and 105. At the same time, the longitudinal channels 112 are moved out of registry with the ports 104, thus cutting off the supply of oil to the chamber 110. The structure for providing a supply of oil to the chamber 108 is substantially the same as that provided for the other embodiment of the invention hereinbefore described and illustrated in Figure 8. A relief valve permits the escape of oil upwardly and through a passage 115 into the discharge pipe 35 when the fluid supply exceeds a predetermined pressure.

A modified form of valve is illustrated in Figures 10, 11 and 12, the parts being substantially the same as those illustrated in Figure 2 except for the arrangement of the valve ports therein. As shown in Figure 10, when the valve slide 52 is in normal position with reference to the extension 47, oil entering the chamber 62 is permitted to flow through a series of ports 116 into a series of longitudinal passages 117 in the outer wall of the slide 52, which passages communicate with a peripheral groove 118 in the wall of the slide 52, this groove being in communication with another groove 119 alongside of it by a number of passages 120 extending between the grooves beneath the outer surface of the slide 52. The groove 119 registers with a series of ports 121 extending through the wall of the extension 47 and communicating directly with the chamber 50. A series of ports 122 also extend through the wall of the extension 47 and communicate with the chamber 50. These ports register with a limited series of ports 123 which extend through the wall of the slide 52. When the brake is in off position, the parts are as shown in Figure 10, the oil entering the chamber 62 passing through the ports 116, the channels 117, the groove 118, the passages 120, the groove 119, and the ports 121 into the chamber 50 and thence out through the ports 122 and 123 into the chamber 60 and on out through the discharge pipe 35 as previously described. If in applying the brake, the foot pedal be moved forward slowly, so that the slide 52 is forwardly displaced with reference to the extension 47 by a relatively small distance, that is, not sufficient to shut off the ports 121 from the groove 119 completely, as shown in Figure 11, the partial closure of communication between the discharge ports 122, 123 which are of relatively small total cross section will tend to build up a small pressure in the chamber 50 since the partial cutting off of the groove 119 from the ports 121 will not affect the volume of inflow to the same extent, the total cross section of the inflow connection between the groove 119 and the ports 121 being considerably larger than the outflow cross section between the ports 122 and 123. Hence when the slack in the brake is taken up relatively slowly, a comparatively low pressure acting on the piston will move the piston without the necessity of building up a higher pressure in the chamber 62 to take up the slack of the brake. If, however, the brake is applied more rapidly to take up the slack motion, the slide 52 will be moved further forward as shown in Figure 11, cutting off the communication between the groove 119 and 121 completely so that sufficient pressure is immediately built up in the chamber 62 to effect a rapid follow-up motion on the part of the piston. When the slack has been taken up, further forward motion of the slide relative to the piston takes place as shown in Figure 12. This motion brings the groove 118 into registry with the ports 121, the discharge connection through the ports 122, 123 being at the same time completely cut off so that the oil is conducted directly to the chamber 50 and the quickly built-up pressure exerts a maximum thrust against the disk of the piston. In other respects, the action of the mechanism is the same as that of the mechanism shown in Figure 2 and hereinbefore described.

Having thus described certain embodiments of my invention, it should be evident to those skilled in the art that various changes and modifications may be made therein without departing from its spirit or scope as defined by the appended claims.

I claim:—

1. A servo-motor comprising a cylinder, a centrally perforated piston slidably fitted within said cylinder, a hollow stem secured to said piston, said stem being closed at its outer end and projecting out from one end of said cylinder, a control rod projecting from the opposite end of said cylinder, said control rod having a hollow portion slidably fitted in the central perforation of said piston and terminating in an enlarged hollow extension slidably fitted within said stem, said extension and said stem having lateral ports through their walls movable into and out of registry by relative axial movement of said rod and stem, and means including said rod and stem for controlling the action of power fluid on said piston, said means normally permitting a continuous flow of power fluid through the cylinder.

2. A servo-motor comprising a casing enclosing two coaxial communicating cylindrical chambers of different diameters, a piston slidably fitted in the larger of said chambers having a hollow stem with a portion slidably fitted in the smaller of said chambers and portions with valve ports opening respectively into said larger and smaller chambers, means for supplying power fluid to the smaller chamber, and control means actuable to build up fluid pressure in the smaller chamber only and further actuable to build up fluid pressure in the larger chamber also, said control means including a member fitted within said hollow stem and movable therein to open and close said valve ports.

3. A servo-motor comprising a cylinder, a centrally perforated piston slidably fitted within said cylinder, a reduced extension on one end of said cylinder forming a smaller cylinder coaxially disposed with relation thereto, a piston slidably fitted in the larger cylinder having a hollow stem slidably fitted in the smaller cylinder and projecting from the end thereof, the projecting portion of the stem being of smaller diameter than the portion adjacent to the piston and forming an external shoulder therewith, said smaller cylinder having a chamber in one portion thereof containing said shoulder, a control rod projecting from the opposite end of the large cylinder and having a hollow portion passing through said piston and slidably fitted within said stem, a one-way valve through said piston opening only when fluid pressure on the face of the piston adjacent to its stem is less than the pressure on the opposite face of the piston and means including said control rod and stem and responsive to relative movement of said rod and stem for controlling the actuation of the piston by power fluid, said means normally permitting free flow of the fluid through the cylinders and operating to build up fluid pressure in the smaller cylinder when the control rod is moved a small amount relative to the stem and to build up fluid pressure in the large cylinder against one side of the piston when the control rod is moved further relatively to the stem.

4. A servo-motor comprising a cylinder having a reduced extension on one end thereof opening into the cylinder, a piston slidably fitted into the cylinder having a reduced hollow perforated stem extending from the cylinder through the cylinder extension and having an intermediate portion slidably fitted in said extension, a control rod projecting from the opposite end of said cylinder and extending through said piston, said control rod having an enlarged hollow perforated extension slidably fitted in said stem for limited movement relative thereto, means for supplying power fluid to said cylinder extension, a one-way valve through said piston opening only when fluid pressure on the face of the piston adjacent to its stem is less than the pressure on the opposite face of the piston and means including the perforated stem and control rod extension for controlling the flow of fluid through the cylinders according to the relative position of the piston and control rod.

5. A servo-motor comprising a cylinder having a rearwardly extending reduced portion, a piston having a hollow stem projecting from the end of said reduced portion, a control rod projecting from the opposite end of said cylinder and having a portion slidably fitted within a portion of said stem for limited movement relative thereto, means for resiliently maintaining said rod at its extreme rearward position relative to said piston, said piston and stem being shaped to form with said cylinder large and small pressure chambers to receive power fluid, and means for supplying power fluid to said smaller chamber, said piston, stem and control rod having ports and passages cooperating to permit unobstructed flow of power fluid through the cylinder when the rod is in its rearwardmost position relative to the piston, said ports and passages being so arranged that upon slight forward movement of the control rod relative to the piston, communication between the small and large chambers is permitted but egress from the large chamber is obstructed whereby fluid pressure is built up in both chambers, and upon further forward relative motion of said rod egress from said small chamber is obstructed whereby pressure is built up in the small chamber only, and upon still further forward relative motion of said rod, communication between the large and small chambers is reestablished and egress from the large chamber is cut off whereby pressure is built up in both chambers against the rear faces of the piston.

6. A servo-motor comprising a cylinder, a reduced extension of said cylinder projecting rearwardly therefrom and opening thereinto, a perforated piston slidably fitted in said cylinder and normally positioned adjacent to the rearward end thereof, a hollow stem formed integrally with said piston extending rearwardly within the cylinder extension, and projecting out from the rearward end thereof, said stem being closed at its outer end and peripherally spaced from the forward and rearward portions of the cylinder extension, forming forward and rearward pressure chambers within said extension, said forward chamber opening into the cylinder to the rear of the piston, said stem also having a portion slidably fitting within said cylinder extension and separating said forward and rearward chambers, a control rod projecting from the forward end of said cylinder and extending through one of the perforations in the piston, one-way valves closing the other perforations in the piston to permit flow therethrough from front to rear only, a hollow extension on said control slidably fitted within said stem, said control rod extension and said stem being provided with cooperating ports and passages controlling the flow of fluid through said cylinder according to the relative positions of the stem and rod extension, and spring means tending to maintain said rod extension at its extreme rearward position relative to the stem.

7. A servo-motor comprising a closed casing, connections on said casing for admitting power fluid thereto, a power-actuable member and a control rod projecting from said casing, and movable relatively to each other, means for resiliently resisting relative movement of said member and rod from their normal positions, means within the casing actuable upon displacement of said rod relative to said member for directing fluid pressure against said member in a direction to follow up the motion of said rod, said means operating to direct fluid pressure against only a relatively small effective area of said member in response to relatively small resistance to follow-up motion of the member, and to direct fluid pressure against a relatively large effective area of said member in response to greater resistance to the follow-up motion of the member.

In testimony whereof I have affixed my signature.

FRANCIS W. DAVIS.